Oct. 23, 1951 B. C. BALDWIN 2,572,098
SEDIMENTATION TANK
Filed March 30, 1950
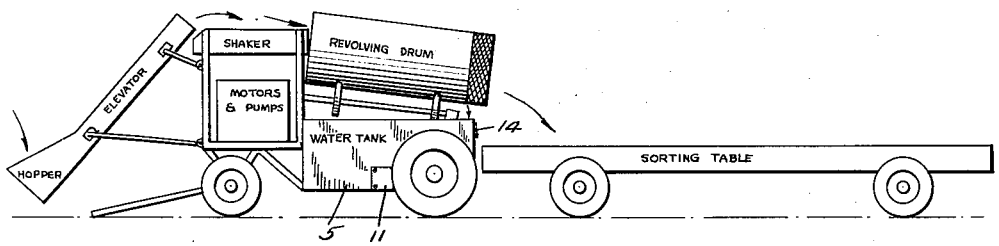
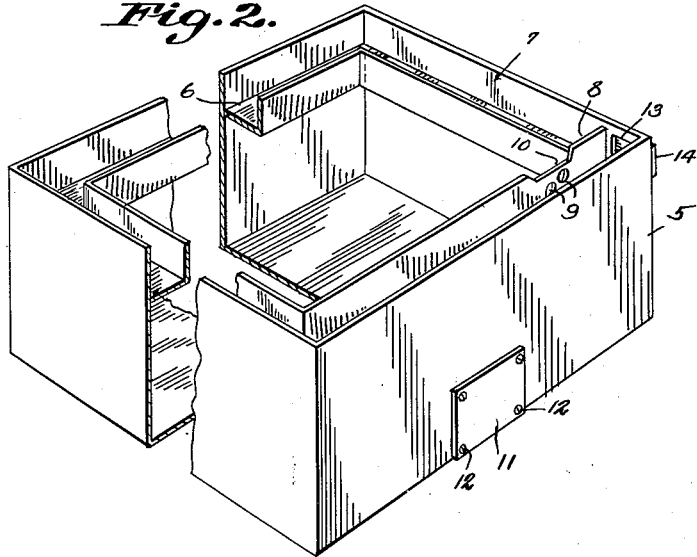
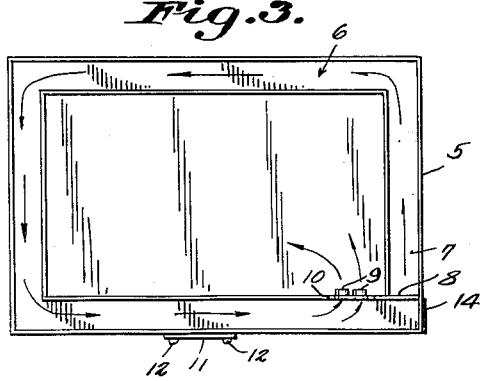
B. C. Baldwin
INVENTOR
BY Chenow+Co.
ATTORNEYS.

Patented Oct. 23, 1951

2,572,098

UNITED STATES PATENT OFFICE 2,572,098

SEDIMENTATION TANK

Burr C. Baldwin, Twin Falls, Idaho

Application March 30, 1950, Serial No. 152,917

1 Claim. (Cl. 210—51)

This invention relates to tank construction, and more particularly to the construction of tanks used in containing water for supplying the necessary cleaning fluid for washing articles, such as potatoes or the like, wherein a quantity of water is recirculated through the machine for washing dirt and foreign matter therefrom.

The primary object of the invention is to provide a tank of this character having a sediment trough supported adjacent to the open upper end of the tank, in which the dirt and foreign matter washed from the potatoes under treatment may be trapped, the water which has been freed of dirt and foreign matter passing into the main portion of the tank for recirculation.

Another object of the invention is to provide a tank of this character having means whereby the tank may be readily flushed out to remove the sediment which may have collected in the trough or in the tank.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Fig. 1 is an elevational view illustrating a diagram of a common form of potato washing machine with which the tank forming the subject matter of the present invention, is used.

Fig. 2 is a perspective view partly broken away, illustrating the construction of the tank and sediment trough.

Fig. 3 is a plan view of the tank.

Referring to the drawing in detail, the tank which may be of any desired dimensions, is preferably rectangular in formation, and is indicated generally by the reference character 5.

The tank is provided with the sediment trough 6, which is disposed adjacent to the open top of the tank, the sediment trough being also rectangular in formation and extending around the entire inner upper edge of the tank, as clearly shown by Fig. 2 of the drawing.

The entrance end of the trough, or the end into which the water from the revolving drum of the potato washer, is directed, is indicated by the reference character 7, and one end of this portion of the trough is closed by the wall 8 so that water in passing from the revolving screening drum to the trough, will be directed through the trough, in the direction of the arrows as indicated in Fig. 3.

Openings 9 are arranged in the wall of the trough adjacent to the entrance or intake end of the trough, the openings being provided so that the water within the trough will be allowed to drain into the main portion of the tank leaving sediment within the trough to be removed, which is accomplished by closing openings 9 and scraping the mud therefrom.

The water in circulating, passes into the main tank through the cut away portion 10 which provides an overflow for the water, into the main portion of the tank.

The tank is provided with an opening through which access may be had to the interior of the tank adjacent to the bottom thereof, so that the tank may be readily flushed to remove sediment therefrom, which may find its way into the main tank from the trough. This opening is normally closed by means of the plate 11 which is held in position by means of screws 12.

The wall of the tank is also provided with an opening 13 which is disposed adjacent to the top of the tank, the opening 13 aligning with one end of the trough so that a hose may be extended into the opening to flush sediment from the trough.

The plate 14 normally closes this opening.

From the foregoing it will be seen that due to the construction shown and described, I have provided a circulating tank for water used in washing articles such as potatoes or the like, wherein dirt and foreign matter is readily removed from the tank as the water circulates, with the result that water which is substantially free of all dirt and sediment, is circulated and directed through the machine for flushing dirt and foreign matter from the articles being washed, thereby insuring a much more satisfactory cleaning operation, than can be accomplished when washing water which has not been freed of dirt and foreign matter, is re-circulated through the washing machine.

Having thus described the invention, what is claimed is:

A water supply tank through which water is circulated, comprising a body portion, a sediment trough including a vertical inner wall disposed within the body portion extended around the upper inner edge of the body portion, an end wall closing one end of the trough whereby water directed to the trough circulates through the trough in one direction, said vertical inner wall of the trough having a cut away portion formed in the upper edge thereof adjacent to one end of the trough, providing an overflow for water from said trough into the supply tank, and said inner wall having drain openings disposed in different vertical levels directly under the cut away portion.

BURR C. BALDWIN.

REFERENCES CITED

The following references are of record in the file of this patent:

UNITED STATES PATENTS

| Number | Name | Date |
| --- | --- | --- |
| 373,257 | Waespi et al. | Nov. 15, 1887 |
| 1,699,948 | Biederman | Jan. 22, 1929 |
| 1,830,848 | Miles | Nov. 10, 1931 |
| 2,129,181 | Morse | Sept. 6, 1938 |
| 2,287,975 | Collins et al. | June 30, 1942 |